US011228599B2

(12) United States Patent
Johansson et al.

(10) Patent No.: US 11,228,599 B2
(45) Date of Patent: Jan. 18, 2022

(54) VERIFICATION OF CREDENTIAL RESET

(71) Applicant: Amazon Technologies, Inc., Seattle, WA (US)

(72) Inventors: Jesper Mikael Johansson, Redmond, WA (US); Max Harwell Funderburk, Seattle, WA (US); Mian Zainulabadin Khurrum, Redmond, WA (US); Kripa Shankar Karukurichi Subramanian, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 16/684,502

(22) Filed: Nov. 14, 2019

(65) Prior Publication Data
US 2020/0084220 A1   Mar. 12, 2020

Related U.S. Application Data

(63) Continuation of application No. 15/959,068, filed on Apr. 20, 2018, now Pat. No. 10,484,390, which is a continuation of application No. 14/969,424, filed on Dec. 15, 2015, now Pat. No. 9,954,867.

(51) Int. Cl.
*H04L 29/06* (2006.01)
*G06F 21/31* (2013.01)
*H04L 29/08* (2006.01)

(52) U.S. Cl.
CPC ............ *H04L 63/102* (2013.01); *G06F 21/31* (2013.01); *H04L 63/083* (2013.01); *H04L 67/22* (2013.01)

(58) Field of Classification Search
CPC ..... H04L 63/102; H04L 63/083; H04L 67/22; G06F 21/31
See application file for complete search history.

(56) References Cited

U.S. PATENT DOCUMENTS

| | | | |
|---|---|---|---|
| 6,871,286 B1* | 3/2005 | Cagle | H04L 63/083 709/225 |
| 8,078,881 B1 | 12/2011 | Liu | |
| 8,396,711 B2 | 3/2013 | Yee et al. | |
| 8,607,330 B2 | 12/2013 | Childress et al. | |
| 8,819,810 B1 | 8/2014 | Liu | |
| 8,904,506 B1 | 12/2014 | Canavor et al. | |
| 9,355,233 B1 | 5/2016 | Chen et al. | |
| 9,355,244 B2 | 5/2016 | Liu et al. | |
| 9,954,867 B1* | 4/2018 | Johansson | H04L 67/22 |
| 10,484,390 B2 | 11/2019 | Johansson et al. | |
| 2005/0175201 A1* | 8/2005 | Herman | H04L 63/083 381/312 |
| 2005/0268345 A1* | 12/2005 | Harrison | H04L 63/104 726/27 |

(Continued)

*Primary Examiner* — Yonas A Bayou
(74) *Attorney, Agent, or Firm* — Davis Wright Tremaine LLP

(57) ABSTRACT

Methods and systems are provided for restoring access for user accounts when suspicious activity is detected. The methods and systems identify any potential suspicious activity or potential misuse associated with a user account. The user account has account privileges associated with a network service. The methods and systems sends a notification to a network application to indicate that account privileges associated with the user account are limited. In response to the notification, a series of tasks to restore access to the user account may be performed.

20 Claims, 12 Drawing Sheets

(56) References Cited

U.S. PATENT DOCUMENTS

| | | | |
|---|---|---|---|
| 2006/0095785 A1 | 5/2006 | White | |
| 2006/0212589 A1* | 9/2006 | Hayer | H04L 67/02 709/229 |
| 2008/0086759 A1* | 4/2008 | Colson | G06Q 30/06 726/2 |
| 2008/0155019 A1 | 6/2008 | Wallace et al. | |
| 2010/0299729 A1* | 11/2010 | Wallace | H04L 63/08 726/5 |
| 2012/0047560 A1* | 2/2012 | Underwood | G06F 21/30 726/4 |
| 2012/0136572 A1* | 5/2012 | Norton | G01C 21/3407 701/465 |
| 2013/0252583 A1* | 9/2013 | Brown | H04L 63/0807 455/411 |
| 2014/0150068 A1* | 5/2014 | Janzer | H04L 63/20 726/4 |
| 2015/0381631 A1* | 12/2015 | Salem | H04L 63/102 726/4 |
| 2016/0261583 A1 | 9/2016 | Zhang | |
| 2018/0241756 A1* | 8/2018 | Johansson | H04L 67/22 |

\* cited by examiner

256

From: Merchant@domain.com
Sent: Friday, January 09, 2015 1:30 PM
To: John Smith
Subject: Password Request

| Reply | Reply All | Forward | Delete |

Merchant Inc.

Reservations | User Account | Fare Sales & Offers

Dear John,

Thank you for visiting domain.com. This email provides you with a link to a password reset page.

Select the link below to be routed to a Password reset page.

Password Reset ~258

E-Retailer – Web Browser

File   Edit   View   Bookmarks   Tools   Help https://www.e-retailer.site/

Enter a New Password: ~262

Re-enter the New Password: ~264

Submit

FIG. 2F

VERIFICATION OF CREDENTIAL RESET

CROSS-REFERENCE TO RELATED APPLICATIONS

This application is a continuation of U.S. patent application Ser. No. 15/959,068, filed on Apr. 20, 2018, entitled "VERIFICATION OF CREDENTIAL RESET," which is a continuation of U.S. patent application Ser. No. 14/969,424, filed on Dec. 15, 2015, entitled "VERIFICATION OF CREDENTIAL RESET," now U.S. Pat. No. 9,954,867, the contents of which are incorporated herein by reference in their entirety for all purposes.

BACKGROUND

E-commerce merchants offer numerous products and services through web-based network resources, where such products and services utilize, at least in part, one or more unique user accounts set up for individual users. Frequently, users forget their passwords. A problem experienced by most online providers concerns resetting passwords, or more generally resetting confidential credentials associated with user accounts. When users often forget a password, they request that the password be reset.

Today before resetting a password, some systems prompt the user for authentication information in an effort to ensure that the individual who is resetting the password is a valid owner or user of the account. For example, one common authentication method includes asking one or more pre-defined security questions (e.g., "Who was your first grade teacher" or "What is your favorite color"). Another common method is to ask dynamic challenge questions regarding an account (e.g., "What was the amount for your last transaction," "How much did you pay in your last payment"). When correct answers are received, the authentication method sends an email message (or text message) to an email address or phone number registered with the account. The email/text message may include either a one-time password or a link to a password reset page.

However, the foregoing methods experience certain limitations. For example, methods that prompt a user for security questions or information regarding an account, assume that such information is private. Often this information is not private. Also, methods that send one-time passwords or links to an email address or phone number assume that the email address or phone number is secure, which is not always true.

BRIEF DESCRIPTION OF THE DRAWINGS

FIG. 2E illustrates a reset message provided in accordance with an alternative embodiment.

FIG. 2F illustrates a credential reset page presented when a user selects the link in accordance with an alternative embodiment.

DETAILED DESCRIPTION

Figure 1A:
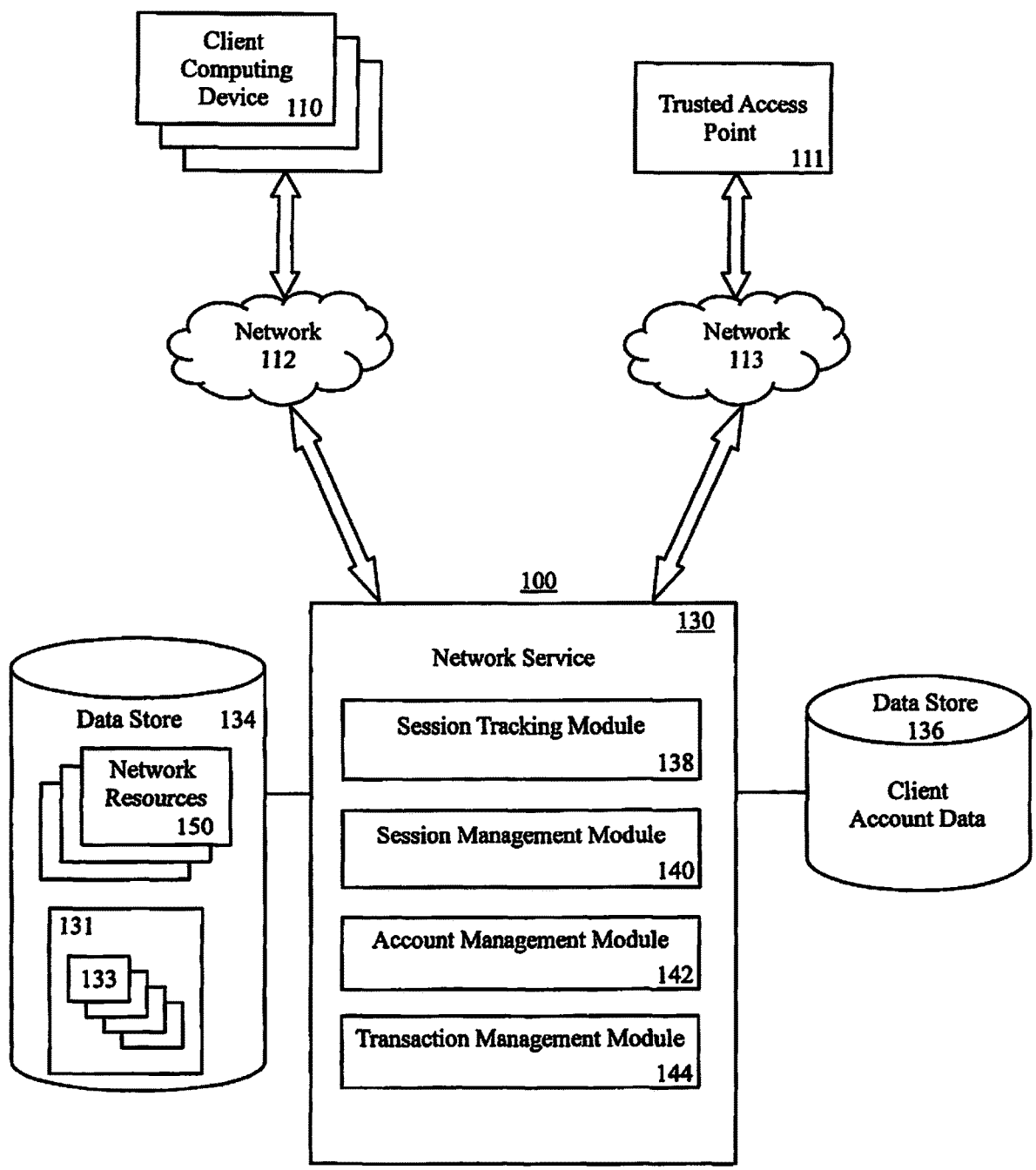
FIG. 1A is a block diagram illustrating a credential reset verification system formed in accordance with embodiments herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods are described that seek to increase the level of security maintained in connection with resetting user account confidential credentials (e.g., a password). The level of security is enhanced by adding a backup verification and a cool-down time period following credential reset. When the credential is reset, a notification is sent to one or more trusted access points (e.g. a known and trusted client computing device, application, etc.). During the cool-down time period the user account remains wholly or partially "frozen" by preventing access to one or more privileges associated with the account. The cool-down time period affords a valid owner or user of the user account an opportunity to learn of the credential reset and to object or approve the reset credentials. When a user account has been compromised, the cool-down time period allows the true owner/user a chance to reverse the credential reset and to take other protective actions. In some cases, during the cool-down time period, the user account may be totally frozen, thereby restricting/denying all account privileges. In other cases, the user account may not be entirely frozen during the cool-down time period. Instead, certain un-restricted privileges may be permitted even during the cool-down time period. For example, restricted/frozen privileges may represent privileges that, if made available to a malicious user, may place at risk the individual user's privacy information, financial information or other confidential information. Un-restricted or non-frozen privileges may correspond to actions that, if accessed by a malicious user, would not expose the individual user to loss of privacy or financial risk (e.g., providing access to existing digital content). The cool-down time period persists for a predetermined period of time or until the valid owner/user of the user account verifies that the credential reset was intended.

Methods and systems herein overcome another challenge in credential reset verification, namely how to notify the true owner or user that credentials (e.g., passwords) have been reset. User accounts are generally associated with an email account or phone number. Often, the email account or phone number is used to authenticate the user and to facilitate password reset. However, if the email account has been compromised or the phone stolen, these techniques may no longer be used to reach the account's true owner in a secure manner.

Methods and systems herein, provide manners to locate and reach the account's true owner. For example, many customers possess multiple devices and/or applications for accessing user accounts. The devices and/or applications are generally and collectively referred to as "access points." For example, an access point may represent a smart phone, tablet device, laptop and desktop computer and other electronic device, as well as a single purpose purchase device or networked environment control devices. As other examples, the access point may represent a browser instance, a phone/tablet application and/or application that is adapted for use with a particular network service (e.g., an airline, hotel or rental car specific application, a financial institution application, an investment service application).

When one access point (e.g., a device and application) is used to reset a credential, the user is notified of the credential reset through another access point associated with the user account (e.g., a different device and application). The notification may provide instructions regarding how to approve, reverse or block the change if the password reset. While waiting for the account owner to be notified of the credential reset and to verify/deny the reset, the user account is placed in a cool-down status by wholly or partially freezing one or more account privileges. By utilizing a cool-down status, while notifying the account owner through an alternative access point, the security associated with resetting/changing credentials for a user account is enhanced.

The term "credential," as used herein, refers to a password, token, email address, phone number or other information that is used by a network service to prove an identity claim of a user. A credential may be reset in various manners. For example, a user may forget (or a malicious user may not know) a credential and step through various operations to change the credential without knowing the prior credential. As another example, a user may know existing credentials, login to a user account and change the credential while logged into the account. The methods and systems described herein are implemented in both of the foregoing situations (as well as other situations); by initiating the cool-down time period and/or utilizing reset notification and verification. The cool-down period may represent a predetermined period of time or may continue indefinitely. For example, the cool-down period may be set to last for a few hours, a few days, one or more months, etc. Optionally, the cool-down period may set to have no end and instead may be maintained permanently or indefinitely until the reset verification is received.

The terms "un-restricted state," "open access status" or "open access state," as used herein, generally refers to the state of a user account during which all available user actions supported by the network service are authorized. When a user account is in an open access state, the network service will grant/respond to requests from client computing devices related to any and all available user actions.

The terms "cool-down state," "cool-down status," "restricted access status" and "restricted access state," as used herein, generally referred to a status or state of a user account, during which none or only a subset of the available user actions supported by the network service are authorized. When a user account is in a cool-down or restricted access state, the network service will grant/respond to requests from the client computing device related to unrestricted account privileges and will deny (not respond) to requests related to restricted account privileges.

FIG. 1A is a block diagram illustrating a credential reset verification system 100 formed in accordance with embodiments herein. The system 100 includes one or more client computing devices 110 that communicate over a network 112, such as the Internet, with a web-based network service (e.g. web hosting provider) 130. The system 100 includes one or more trusted access points 111 that communicate over a network 113, such as the Internet, with a web-based network service (e.g. web hosting provider) 130. A trusted access point 111 may correspond to a trusted client computing device, application, browser and the like. The network service 130 may communicate with the client computing devices 110 and trusted access points 111 over a common network or different networks. The client computing devices 110 and trusted access points 111 may be implemented as any number of other types of computing devices. These devices may include, for instance, PCs, laptop computers, mobile phones, set-top boxes, game consoles, electronic book readers, a personal computer and a personal digital assistant (PDA), a wireless speaker and voice command device including a seven-piece microphone array and so forth.

Additionally or alternatively, a trusted access point 111 may correspond to a networked dedicated device, such as a single purpose purchase device, a networked environment control device and the like. Network dedicated devices generally represent electronic devices that are configured to communicate over a network and to perform specific or dedicated actions. One example of a single purpose purchase device represents a DASH™ device that allows a user to generate an order request for a particular item through a very simple operation, such as pressing a button. Another example of a single purpose purchase device represents a device for refilling an order of laundry detergent, a particular office supply (e.g. printer cartridges, paper, etc.) and the like. An example of an environment control device may be a thermostat, a lighting control, a fire alarm and the like. The devices may have a user interface with one or more inputs and/or a display screen. Additionally, the device may represent a fitness tracker, a smart watch and other device that can be indirectly connected to a network.

The networks 112, 113 represent any one or combination of multiple different types of networks, such as cable networks, the Internet, private intranets, local area networks, wide area networks, wireless networks, and the like.

The network service 130 represents a network site (e.g., a website) that is capable of handling requests from many users and serving, in response, various network pages (e.g., web pages) that are rendered at the client computing devices 110 and trusted access points 111. For instance, the site can be any type of site that supports user interaction, including online retailers, informational sites, social networking sites, blog sites, search engine sites, news and entertainment sites, and so forth. In another example, the network service 130 may provide applications for the client computing devices 110 and trusted access points 111 to download, store, and run locally. The network service 130 may additionally or alternatively interact with the client computing devices 110 and trusted access points 111 to provide content in other ways.

As one example, the network service 130 represents a merchant website that hosts an item catalog 131 that stores one or more items 133 and/or information regarding the items 133. An item includes anything that the merchant wishes to offer for purchase, rental, licensing, subscription, viewing, informative purposes, or some other form of consumption. In some embodiments, the item may be offered by the merchant for consumption. In some other embodiments, the merchant may host items that others are selling using the merchant's website. An item can represent a product, a service, a discussion forum, a digital download, a news clip, user-created content, information, or some other type of sellable or non-sellable unit.

The network service 130 includes, among other things, a session tracking module 138, session management module 140, an account management module 142 and a transaction management module 144. The modules 138-144 cooperate, as described herein, to verify reset of user credentials and to manage cool-down time periods in connection therewith. The modules 138-144, as well as other modules and services described herein, are implemented by one or more processors performing program instructions (e.g., stored in data stores 134 or 136) to perform the operations described herein. The network service 130 interacts with one or more memories or data stores 134 and 136 in various manners as explained herein. One or both of the memories or data stores 134 and 136 may store program instructions to direct one or more processors to carry out the instructions described herein. The data store 136 stores client account data in connection with user accounts. The client account data may include various types of information, such as user credentials (e.g. user ID, password, email address, phone number, or token). The client account data may also include challenge questions, one or more known access points, trusted access points, lists of restricted and unrestricted account privileges, and the like. The client account data may also include one or more of the following types of information (among other things): (a) the user's purchase history, including dates of purchase, (b) a history of items recently viewed by the user, (c) the user's item ratings profile (if any), (d) the current or main item being viewed by the user and/or main items in the user's personal shopping cart(s), and (e) a listing of similar or recommendation items that relate to the main item being viewed or in the user's shopping cart.

Further, the data store 134 may store network resources 150, such as files containing HTML code or other codes to define individual resources. The data store 134 may also store one or more catalogs related to items that may be searched by the user. For example, web content (text, pictures and other content) may be stored in connection with item detail pages associated with the individual items. It is recognized that the various content may be stored at locations distributed between various data storage areas, geographic locations, file structures, recommendation services, e-commerce catalogs and the like.

Network resources 150 are provided to the client computing devices 110 in response to requests, such as one or more client requests. When a network resource 150 is related to a financial transaction (e.g. purchasing a product or service, accessing a bank account), financial data may also be conveyed in the client data. For example, financial client data may include clickstream data, shopping cart content and shopping cart dollar totals, aggregated sales data over time and the like. Other examples of information provided in a HTTP content request include source port, proxies, destination IP address, destination port, host, protocols, requesting methods and content, user agents, referring pages, cookies, connection controls, cash controls, authorizations and the like. Additionally, the network resource 150 may relate to a non-financial transaction, such as downloading private pictures from a network storage drive, accessing an author page for an electronic reader device and the like.

During operation, the session management module 140 maintains network sessions with various client computing devices 110. As an example, a request, within a network session, may represent a checkout request in connection with an e-commerce network session. The session management module 140 reviews incoming requests and determines, among other things, whether the incoming requests seek to reset a user account credential. When a request is received to reset a credential, the session management module 140 responds with a user confirmation page asking the user one or more questions regarding the user and/or the account. While the confirmation page is intended as a first level of security to prevent unauthorized access to user accounts, as noted herein, often the questions and answers utilized with the confirmation page may become compromised and third parties may learn this information. Accordingly, the types of questions and answers presented through confirmation pages do not provide satisfactory security alone for avoiding unauthorized access. When the session management module 140 receives correct answers to the confirmation questions, management of flow is passed to the account management module 142.

The account management module 142 performs various operations in connection with resetting credentials. By way of example, the account management module 142 may send a temporary password, or a link to a password reset page, to one or more access points designated by a user account. The account management module 142 then interacts with the client computing device to enable the user to change the credential as desired. The change may occur in connection with resetting a credential that the user cannot remember, in connection with logging into an account and changing a credential that the user knows, etc. In connection with changing the credential, as an additional level of security, the account management module 142 sends a reset notification to one or more trusted access points associated with the user account. The account management module 142 also sets a status of the user account to a cool-down status, during which all or a portion of the account privileges are denied. Prior to changing the account status to the cool-down status, the user account is in a generally open access state, during which all authorized account privileges are available. For example, the account privileges may be separated into restricted and unrestricted account privileges. During the cool-down time period, actions associated with restricted account privileges are denied, while actions associated with unrestricted account privileges are permitted. The account management module 142 also determines the duration of the cool-down status. For example, the cool-down status may persist indefinitely or for a predetermined cool-down period of time. Optionally, the cool-down period of time may be terminated prematurely when a reset verification is received, from a trusted access point or other verified access point. The account management module 142 denies or approves actions related to restricted and unrestricted account privileges based on whether the user account is in the cool-down status or the open access status.

The account management module 142 manages the availability or use of account privileges during a network session. As explained herein, the account privileges may be classified in various manners, such as to represent restricted privileges and unrestricted privileges. The account management module 142 allows a client computing device to perform actions in connection with unrestricted account privileges at any time, regardless of whether the user account is in a cool-down status. The account management module denies actions in connection with restricted account privileges when the user account is in a cool-down status.

The session tracking module 138 tracks information of interest in connection with network sessions. By way of example, the session tracking module 138 may generate and manage unique access point designators in connection with individual access points. For example, the session tracking module 138 may assign an access point designator in connection with a unique combination of an IP address, MAC address, user agent and the like. Additional or alternative types of information may be utilized to associate an access point designator with an individual client computing device, application, browser or a combination thereof. Optionally, the session tracking module 138 may also record various information of interest in connection with each network session as described herein.

The transaction management module 144 manages notifications that are sent to client computing devices during fulfillment of an order. For example, when an item is ordered through an e-commerce merchant, the transaction management module 144 tracks the status of the order. When changes in the status occur, the transaction management module 144 identifies the type of notice that should be sent to one or more client computing devices associated with the user account. The type of notice may vary based upon whether the user account is in a cool-down status. For example, more detailed notices may be sent concerning changes in order status when the user account is not in a cool-down status, while more limited notices may be sent concerning changes in order status when the user account is in a cool-down status. When a user account is in an open access status, the transaction management module 144 may implement various actions to ensure that the valid owner of the user account has received the limited notice, before sending a more detailed notice.

Figure 1B:
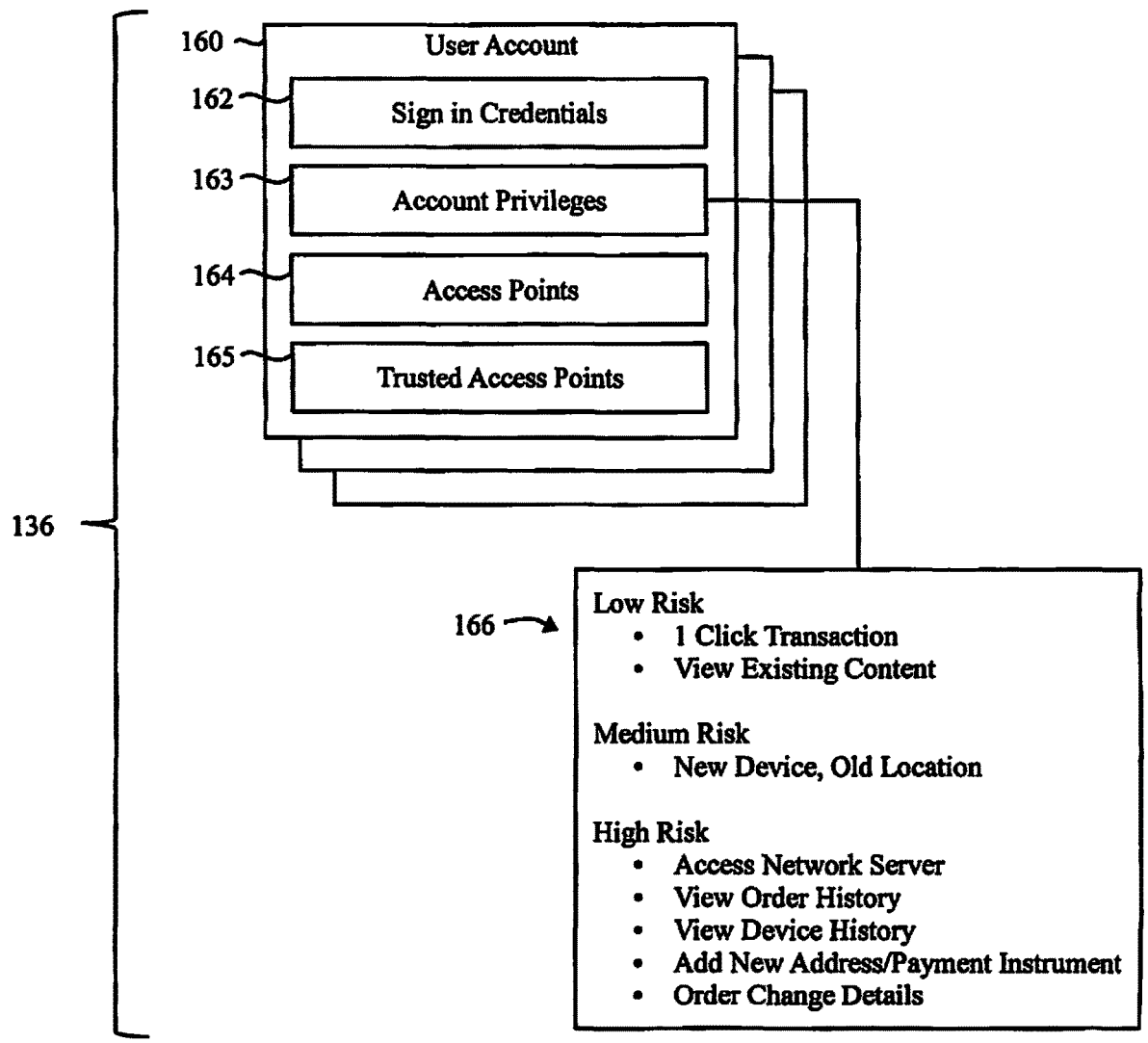
FIG. 1B illustrates a portion of the data stored in the system of FIG. 1A in accordance with embodiments herein.

FIG. 1B illustrates a portion of the data stored in the data store 136 (FIG. 1A). The data store 136 stores multiple user accounts 160. The user accounts 160 include, among other things, credentials 162, account privileges 163, a list of known access points 164 and a list of trusted access points 165. The credentials 162 may include user IDs, passwords, email addresses, phone number and the like. The user accounts 160 also include questions and answers pre-defined by the user. The list of access points 164 represent client computing devices, browsers and/or applications (and combinations thereof) that have been used by the user in the past during network sessions. For example, an access point may correspond to an email account, or phone number associated with the user account. Optionally, an access point may represent a network application operating on one or more client computing devices (e.g., Mshop operating on a tablet device or smart phone). The list of access points 164 may include session history information related to network sessions. For example, the session history information may identify when an access point was last used, for what purpose the access point was used and the like.

The trusted access points 165 represent a subset of access points that are known (or reasonably believed) to be secure (or at least partially secure). The trusted access points 165 may be designated by the valid owner of the user account (e.g., at set up time) or automatically added over time based on various criteria.

The session tracking module 138 identifies access points in accordance with embodiments herein. For example, the session tracking module 138 monitors a session history associated with one or more network sessions maintained by the user in connection with the network service. The session tracking module 138 may record various header information from one or more incoming requests from a client computing device when a user initiates a network session and/or through the network session. For example, the IP address, user agent, MAC address and other information may be recorded from requests received at the network service 130. The session tracking module 138 also identifies and records information regarding the browser or application used by the client computing device in connection with the network session. The session tracking module 138 may store the session behavior information such as session start/end times, session durations, and the like, in the data store 136.

The session history may be utilized to update the list of available access points 164 and trusted access points 165 (FIG. 1B). For example, a user may frequently access a network application on a client computing device in connection with the user account and/or network service. The network application may be saved as a frequent access point. The network application may also be designated as a trusted access point 165 based on various criteria, such as whether a certain level of security is required to utilize the network application, based on whether the network application is running on an electronic device that is physically tied to a particular location (e.g. an office computer, a networked television installed in a home, etc.). The session history may also be utilized to remove access points 164 and remove trusted access points 165 from the resources available for reset notifications and reset verifications. For example, a user may have an old networked television that the user no longer utilizes. The session history may indicate that a particular network television has not been used in an extended period of time, and thus may be removed from the list of access points or trusted access points.

During operation, when a request is received from a client computing device, the session tracking module 138 determines whether the request identifies an existing network session. When a network session does not yet exist that is associated with the request, the session tracking module 138 generates a network session identifier to be used in connection with the network session (e.g. as a cookie conveyed to and from the client computing device). The session tracking module 138 reviews the request and header information to determine whether a unique access point designator has already been assigned to the client computing device and application/browser, from which the request originated. When a unique access point designator does not yet exist, the session tracking module 138 generates a unique access point designator. When an access point designator already exist, the session tracking module 138 may review a list of access points 164 (associated with the user account) to determine whether the current access point is on the list. When the current access point is not on the list, the list may be updated to add the new access point. Optionally, the session tracking module 138 may include, within the list, a record/count of how often a particular access point is used. Optionally, the session tracking module 138 may include, within the list, a time stamp for when the particular access point was last used.

The account privileges 163 may be maintained in a prioritized list 166 for the associated user account 160. For example, the prioritized list 166 may be ordered based on transactions that have high, medium and low risk, such as regarding monetary risk or obtaining control over a user's confidential information. The individual privileges associated with each level of risk may be automatically determined by a network service administrator, or alternatively may be at least partially designated by the user during an account set up operation. The account privileges 163 represent at least a subset of the potential privileges associated with the user account that may be performed in connection with network services. The level or type of risk is divided in accordance with the types of actions/account privileges that are permitted and denied when a potential malicious user or account breach has occurred. For example, high risk account privileges represent actions that, if made available to a malicious user, would place the individual user's privacy information, reputation, financial information or other confidential information at great risk. Low risk account privileges represent actions that, if performed by a malicious user, would expose the individual user to very limited privacy, reputation or financial risk. Low risk account privileges may be made available during the cool-down time period even when no reset verification has been received. During the cool-down time period, the high risk account privileges are denied until expiration of the cool-down time period or a reset verification is received.

In the example of FIG. 1B, high risk account privileges may correspond to requests/attempts to access a network server, view an order history for a corresponding user account, view a device history for a client computing device associated with the user account, and to add/change an address and/or financial payment information. Other examples of high risk privileges represent a request of attempt to access root credentials for an instance, or move an instance to a new client computing device. Low risk account privileges correspond to requests or attempts to perform a one click transaction, and view existing content (e.g. a book, music, etc.). Another example of a low risk privilege represents an attempt or request to start a new instance during a network session. Medium risk account privileges represent various types of activities that are generated from a client computing device that has not been used with the account in the past, however is physically located at a location, at which other client computing devices have been used with the user account. For example, a medium risk may be assigned to a nonfinancial request that originates at a new desktop computer that is located at the home of the owner of the user account. Alternatively, when the same type of request is received from a new client computing device that is located at an entirely new and unknown location, the request may be viewed as high risk and processed accordingly.

In the foregoing example, the account privileges 163 are associated with high, medium and low risk by an administrator or in an automated manner beyond the control of the account owner. Optionally, the account owner may be afforded the opportunity to assign a level of risk to different account privileges 163. For example, a list of specific privileges may be presented to the user and the user permitted to designate each privilege to have high, medium or low risk. Additionally or alternatively, general categories of privileges may be presented to the user and the user permitted to designate the categories of privileges to have high, medium or low risk.

In many implementations, such as retail e-commerce accounts, individual account owners may not wish to go through the process to classify individual privileges or categories of privileges. The account owner may simply accept default or standard classifications of privileges. The account owner may be afforded the opportunity, through the user profile, to modify default privilege classifications. Alternatively, the account owner may not be afforded any opportunity to adjust privilege classifications. In alternative implementations (e.g., web service environments), system managers may wish to have detailed control over classifying privileges.

Optionally, the privileges may be classified in other manners besides high, medium and low risk. For example, the privileges may be classified as deny or allow during a cool-down time period. In this alternative embodiment, the privileges may be designated as restricted privileges (e.g., to be denied during the cool-down time period) or un-restricted privileges (e.g., to be allowed during the cool-down time period).

FIGS. 2A-2E illustrate examples of network resources/ pages generates by the network service 130 (FIG. 1A) and presented on displays of client computing devices 110, 111 in accordance with embodiments herein. The resources/ pages illustrated in FIGS. 2A-2E are also referred to as responses and are provided from the network service 130 to the client computing devices 110, 111 in response to various requests.

Figure 2A:
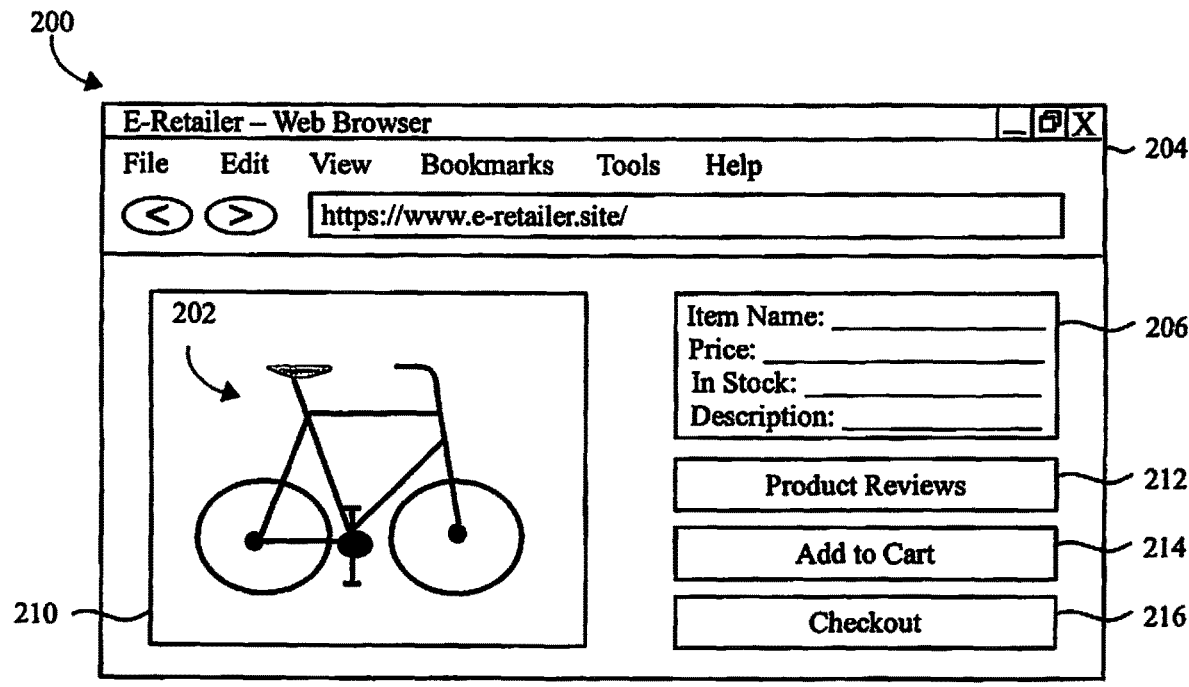
FIG. 2A illustrates an example network item page generated during a network session and presented on a client computing device.

FIG. 2A illustrates an example network item page 200 that may be generated during a network session and presented on a client computing device 110. The item page 200 represents an example of a network resource that may be presented during an e-commerce network session in which the user is searching for a product online. The item page 200 represents one of various types of responses that may be provided by the network service 130 to the client computing devices 110 during an unauthenticated portion (e.g., before logging into an individual user account) of a network session. The network service 130 may provide, during an unauthenticated portion of a network session, responses that include various types of search pages, product specific pages, user reviews as well as other types of response pages that do not require sensitive information regarding an individual user, or access to a specific user account.

FIG. 2A illustrates an example of an image window 210 in connection with an e-commerce network session, according to at least some embodiments. When a user navigates to an item page 200 on an online merchant's website, product/ item information 206 may be displayed, for example vendor- or manufacturer-supplied descriptions, images, pricing information, availability information, product numbers, ordering information, and so on. The item page 200 may also include various user navigation elements 204 such as menus, buttons, tabs, scroll bars, hot links, and so on, that may be used for navigation (e.g., go to another page), page control (e.g., scroll down), or various other purposes. The user may interact with the user navigation elements 204 of the item page 200, for example using a cursor control device such as a mouse and a keyboard or, on a touch-enabled device, touch gestures input to a touch screen.

In some embodiments, the item page 200 may include one or more user reviews (not shown) that provide user ratings and user comments related to the overall item displayed in the image 202. Additionally or alternatively, the item page 200 may include a product review icon 212. The item page 200 may also presents an "add to cart" icon 214 that may be selected by the user in order to add the item to a list of items that the user wishes to purchase. The item page 200 also includes a "checkout" icon 216 that may be selected when the user wishes to complete a transaction to purchase one or more items from the user's "shopping cart."

In the example of FIG. 2A, when the user selects the checkout icon 216, a checkout request is sent from the client computing device 110 to the network service 130. The checkout request represents one example of a type of request that is associated with a transition from unauthenticated network resources to authenticated network resources. In order for the network service 110 to fully respond to the checkout request, sensitive user information will be accessed at some point in the checkout workflow. Hence, a checkout request is treated as a transition point that requires the user to first login to a user account before the checkout workflow can continue. When the checkout icon 216 is selected, the user is next presented with an account login page. Optionally, a network session may be routed directly to an account login page, such as by entering a network address into a browser for an account login page, opening an application that immediately launches an account login page, or otherwise.

Figure 2B:
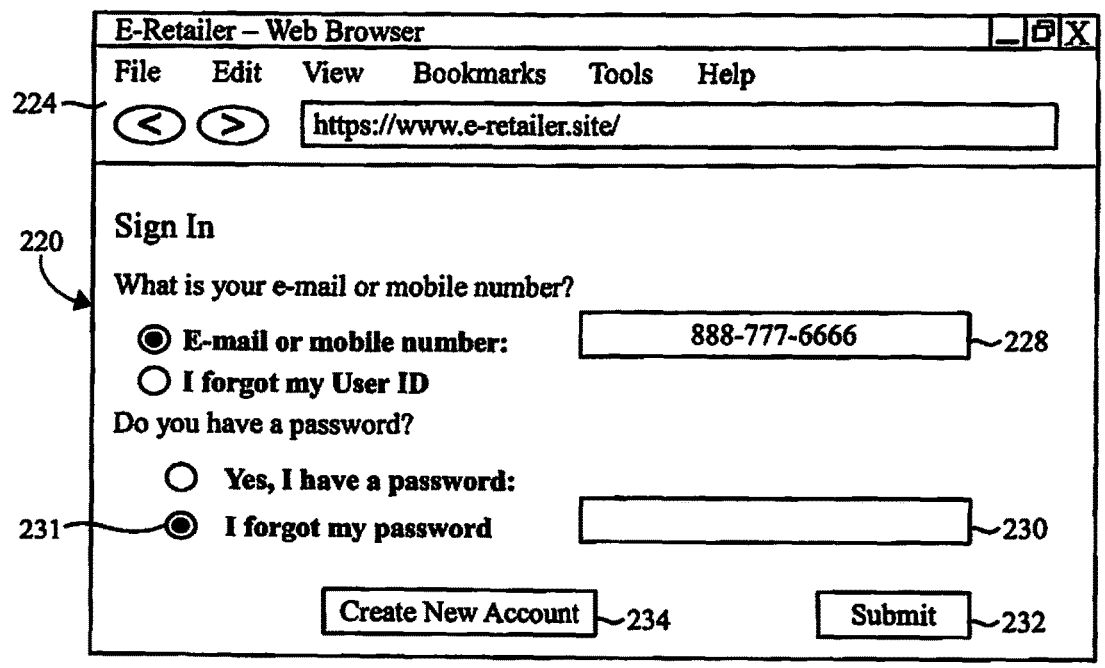
FIG. 2B illustrates an example of an account login page presented in connection with various network sessions in accordance with embodiments.

FIG. 2B illustrates an example of an account login page 220 that is presented in connection with various network sessions in accordance with embodiments. Optionally, a network session may present the account login page 220 in response to various prior requests and responses. For example, in place of the item page 200 (FIG. 2A), other types of pages may be presented in connection with other types of network sessions, such as when logging into financial accounts, business accounts, and other types of network services that enable users to navigate through certain network resources. The account login page 220 includes navigation elements 224 and user directions informing the user that a username and password are required to login to the user's account. For example, the user directions may provide "Please enter a username and password to login to your user account." The account login page 220 also includes a username field 228 and a password field 230, in which the user may enter his/her username and password. The account login page 220 also includes a "submit" icon 232 and a "create new account" icon 234.

The account login page 220 also includes a reset request field 231 provided in connection with a descriptor such as "I forgot my password." When the user has forgotten the password, the reset request field 231 may be checked and (when the submit icon 232 is selected) a corresponding request is sent from the client computing device to the network service 130. The request represents a request to change a credential, namely the password in the present example. Optionally, other reset request fields may be provided in connection with the user ID, email, phone number and other credentials.

Figure 2C:
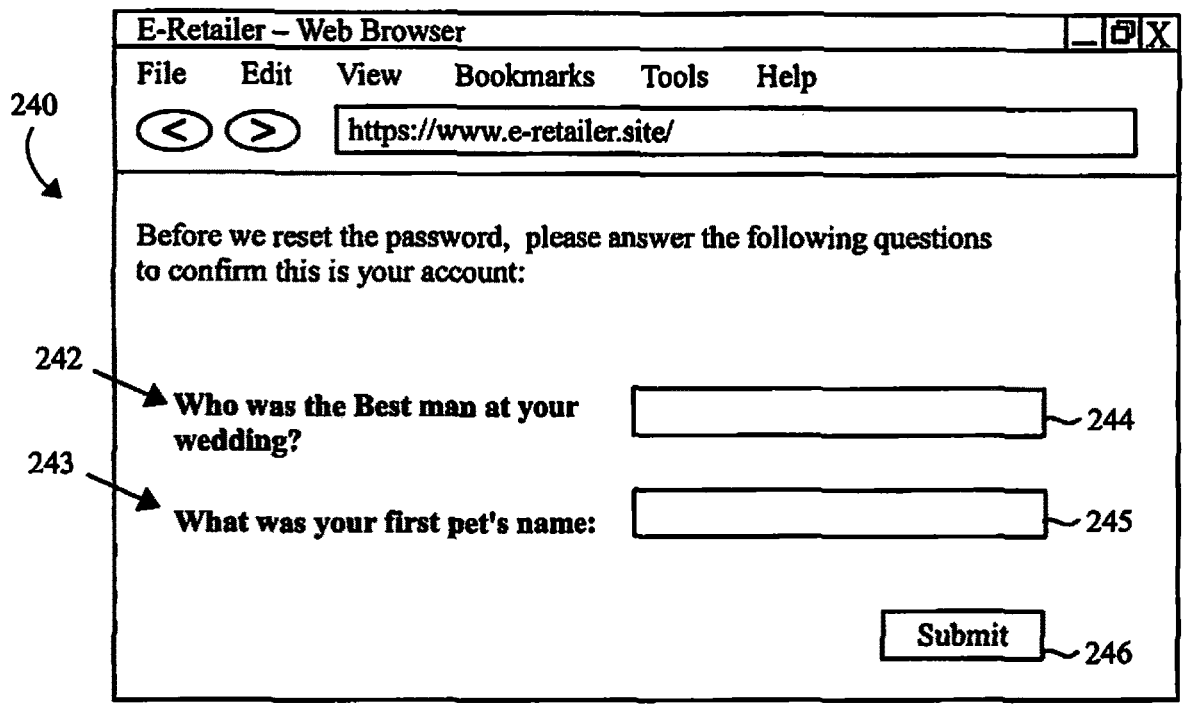
FIG. 2C illustrates an example of a user confirmation page provided in accordance with embodiments herein.

FIG. 2C illustrates an example of a user confirmation page 240 that is provided to the client computing device 110 in accordance with embodiments herein. The user confirmation page 240 is provided in response to a request by the user to change a credential. For example, the user confirmation page 240 is provided in response to a user selection of the reset credential field 231 (FIG. 2B). The user confirmation page 240 provides a message prompting the user to answer predetermined challenge questions, before the credential reset process can continue. For example, the following message may be provided: "Before we reset the password, please answer the following questions to confirm this is your account." Various types of questions challenge 242-243 may be presented in the confirmation page 240. By way of example, the questions challenge 242-243 may be based on information entered when the corresponding user account was set up. For example, the questions may include "Who was the best man at your wedding?" and "What was your first pet's name?" It is recognized that various other types of confirmation information and questions may be presented. The user enters one or more confirmation answers in the confirmation fields 244 and 245, and selects the submit icon 246.

Figure 2D:
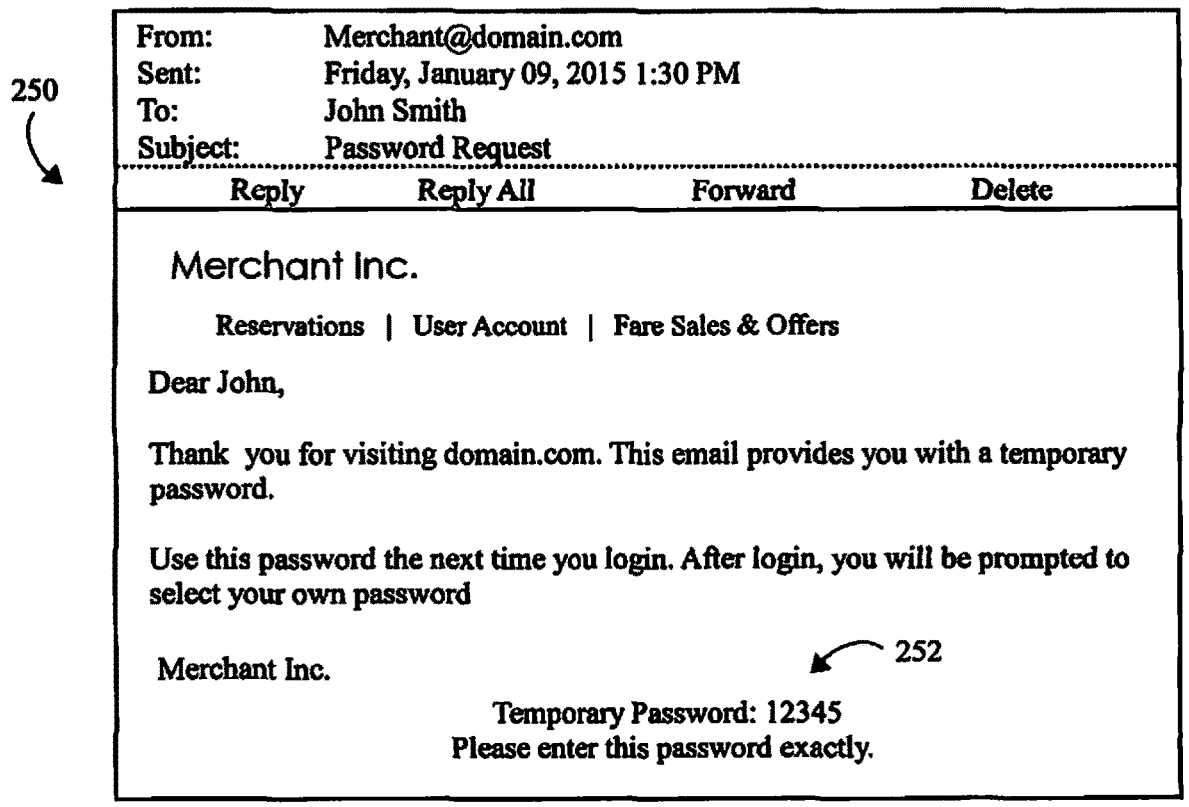
FIG. 2D illustrates a reset message provided in accordance with embodiment.

FIG. 2D illustrates a reset message 250 that may be provided by the network server 130 in accordance with embodiment. As one example, the reset message 250 may be sent when the answers to challenge questions entered by the user match the answers saved in connection with the user account. In the example of FIG. 2D, the reset message 250 is presented as an email message through an email application operating on a client computing device. Optionally, the reset message 250 may be presented through various other applications, through a network browser, as a text message on a phone, through a social media application and the like. When the credential reset message 250 is sent to an email account, the reset message 250 may be opened and viewed on any client computing device 110 that has access, and is logged in to, the user's email account.

In the example of FIG. 2D, the reset message 250 is directed to the email address for "John Smith" that is associated with the user account. The reset message 250 informs the user that a temporary password 252 has been established and provides the temporary password "12345" in the body of the reset message 250. Upon receiving the temporary password, the user would open a browser or other application, navigate to the login page and use the temporary password "12345" to login to the user account. The temporary password represents a one-time password, and thus the user would enter a new password immediately thereafter.

FIG. 2E illustrates a reset message 256 that may be provided by the network server 130 in accordance with an alternative embodiment. In the example of FIG. 2E, the reset message 256 is presented as an email message through an email application operating on a client computing device. The reset message 256 does not directly provide a temporary password 252, but instead directs the user to "Select the link below to be routed to a password reset page." A link 258 is provided that, when selected, provides a request to the network service 130 to respond with a network resource (e.g. network page) associated with resetting an account password. When the link 258 is selected, a browser may be launched on the client computing device to present a credential reset page.

FIG. 2F illustrates a credential reset page 260 that may be presented when a user selects the link 258 (FIG. 2E). The credential reset page 260 includes a message to enter a new password in a new credential entry field 262. Optionally, the credential reset page 260 includes a second message to reenter the new password in a second new credential entry field 264. Once the user has chosen the new password and entered it into fields 262 and 264, the user submits the new password to be saved in connection with the user account (corresponding to the operation at 312 in FIG. 3A for changing a credential).

Figure 2G:
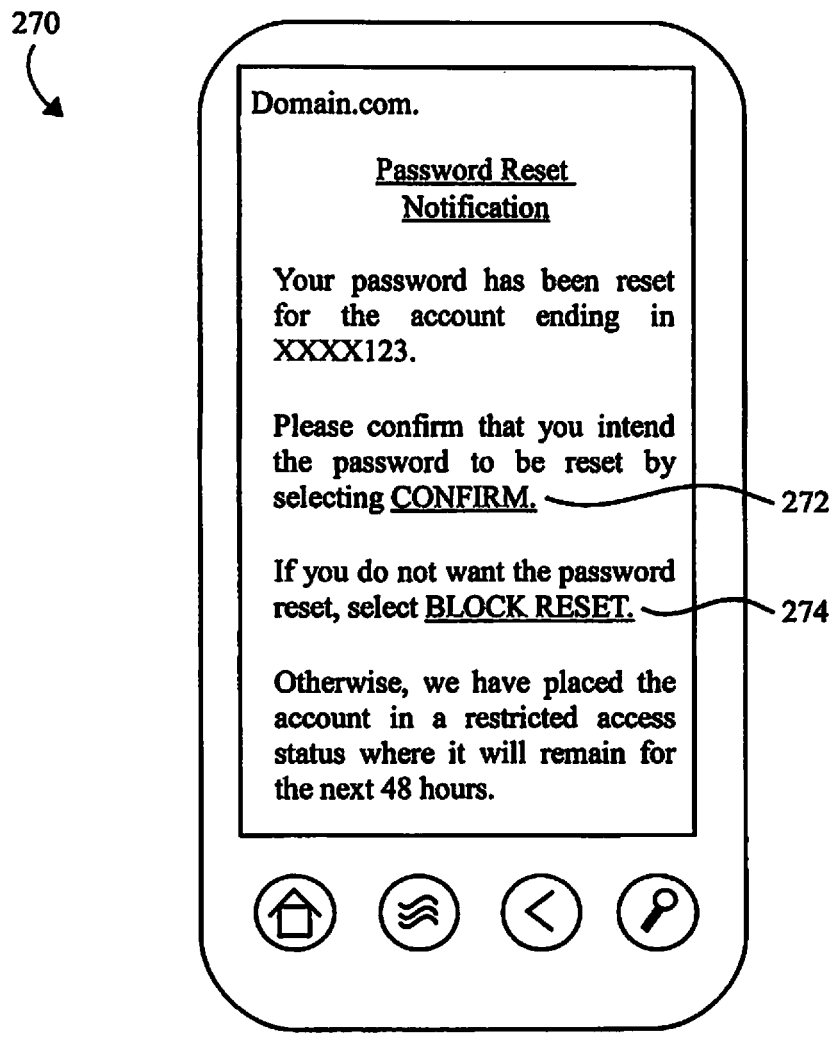
FIG. 2G illustrates a reset notification message provided in accordance with embodiments herein.

FIG. 2G illustrates a reset notification message 270 that may be provided by the network service 130 in accordance with embodiments herein. The reset notification message 270 is sent to one or more trusted access points 111 (FIG. 1A) that are saved in connection with the user account. The reset notification message 270 indicates that a credential, namely the password, has been changed in connection with the user account, for example stating "Your password has been reset for the account ending in XXXX123." The reset notification message 270 also requests that the user confirm that they intended to change their password and provides a confirmation link 272 that may be selected by the user. When the user selects the confirmation link 272, the trusted access point 111 automatically returns a reset verification instruction to the network service 130. The reset notification message 270 also informs the user that the status of the user account has been set to correspond to a cool-down state or status, and indicates a time period for which the user account will remain in the cool-down state or status, unless earlier terminated by a reset verification from the user. The reset notification message 270 represents one example of the type of notification that may be sent to a trusted access point to inform a valid owner or user of a credential reset and to afford the owner/user the opportunity to confirm or take other appropriate actions.

Optionally, the reset notification message 270 may include an additional notice to provide the user the opportunity to block the password reset operation. For example, a message may be presented that "If you do not want the password reset, select BLOCK RESET." A block reset link 274 is provided that, when selected, directs the trusted access point 111 to send a reset deny instruction to the network service 130.

The pages and messages illustrated in FIGS. 2A-2G illustrate examples of potential implementations and manners in which information is presented to and collected from users. It is recognized that alternative pages and messages may be conveyed to various types of client computing devices 110 and trusted access points 111. The examples illustrated in FIGS. 2A-2G are also described in connection with completing an e-commerce transaction for a select item, where a user is prompted to login to the user account before completing the purchase of the item of interest. As noted herein, credential reset operations may be performed in connection with alternative workflows independent of e-commerce transactions. For example, a user may login to a user account and perform various operations to change their credentials, separate and apart from e-commerce transactions. Example pages are illustrated hereafter that may be presented on client computing devices 110 and/or trusted access points 111 when seeking to change a credential after logging into a user account.

Figure 2H:
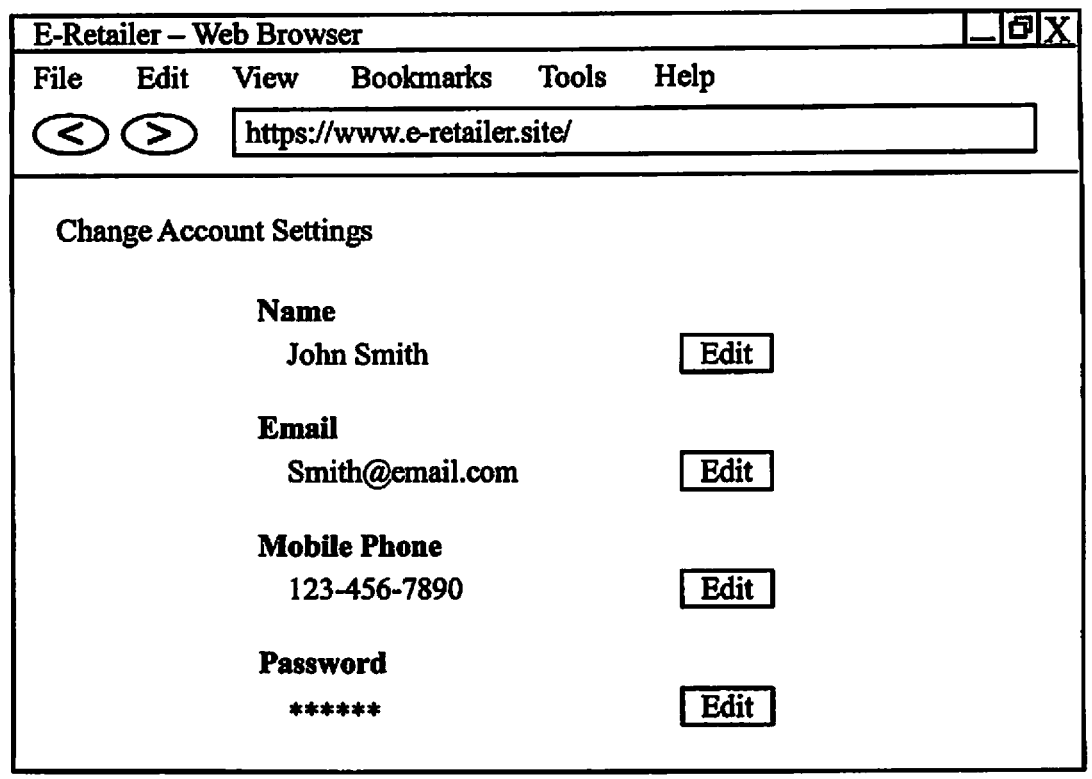
FIG. 2H illustrates a user credentials page presented in connection with embodiments herein.

FIG. 2H illustrates a user credentials page 280 that may be presented by the network server 130 in connection with embodiments herein. For example, the user credentials page 280 is presented to a user after the user has logged into the user account and selected an option to change his or her account settings. The user credentials page 280 provides a list of account settings that may be changed, such as name, email address, mobile phone number, password and the like. When the user selects an "edit" icon for a corresponding credential, a credential reset page may be presented to the user. For example, when the user chooses to edit the password, the credential reset page 260 (FIG. 2F) may be presented to the user to afford the opportunity to enter a new password. Optionally, alternative credential reset pages may be presented based upon the type of credential to be reset. Once the new password is entered, a reset notification message (as illustrated in FIG. 2G) may be sent to one or more trusted access points.

Figure 3A:
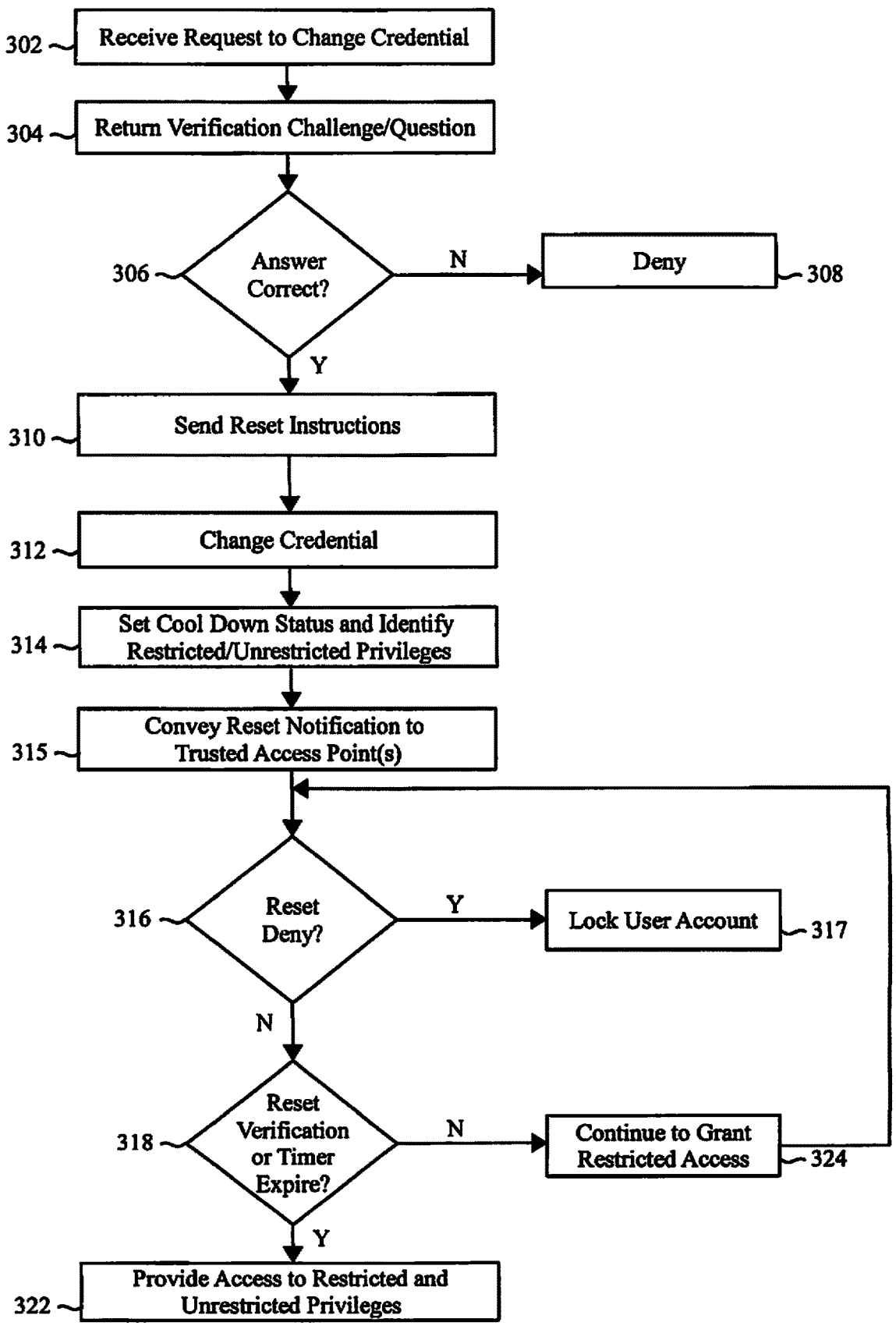
FIG. 3A illustrates a process carried out in accordance with embodiments herein for providing backup verification to account changes.

FIG. 3A illustrates a process carried out in accordance with embodiments herein for providing backup verification for credential changes. At 302, the session management module 140 receives a request to reset a credential associated with a user account. For example, the request may be generated when the user selects an option on an account login page indicating that the user has forgotten a password. As another example, the request may be generated when the user has already logged into a user account and selected an option to change a password.

At 304, the session management module 140 returns a verification question to the client computing device 110 requesting to reset the credential. For example, the session management module 140 identifies one or more challenge questions and answers that have been established in connection with the user account. The challenge questions are returned as the verification questions.

At 306, the session management module 140 receives answer(s) to the challenge question(s) and determines whether the answer(s) match predetermined answer(s) associated with the user account. When the incoming answer(s) do not match the predetermined answer(s), flow moves to 308, where the request is denied. Otherwise, flow advances to 310. At 310, the account management module 142 sends a reset instruction (e.g., a temporary password or link) to one or more access points designated for the user account. For example, an access point may correspond to an email account, or phone number associated with the user account. The access points may be determined from the list of access points 164 (FIG. 1B) for the corresponding user account. As noted herein, an access point may represent a network application operating on one or more client computing devices (e.g., Mshop operating on a tablet device or smart phone). Optionally, the temporary password may be returned to any client computing device 110 that requests the credential reset and then correctly answers the verification/challenge question(s).

At 312, the account management module 142 interacts with the client computing device 110 to enable the user to change one or more credentials related to the request. For example, the account management module 140 may carry out requests and responses in a network session to permit the user to login with the temporary password and change the password to a user chosen new password.

Optionally, 304 to 310 may be omitted and no challenge questions may be used. Instead, flow may move directly from 302 to 310. Optionally, the operations at 302 to 310 may be implemented by a user calling a customer service individual and verbally requesting the credential to be changed. For example, at 302, the customer service individual may be contacted (e.g., called) with the request. The customer service individual may then send a password reset instruction to the access point at 310.

At 314, the account management module 142 sets a status of the user account to a cool-down status. The user account remains in the cool-down status for up to a predetermined cool-down time period, during which at least a restricted subset of the account privileges are denied/unavailable. At 314, the account management module 142 also identifies which account privileges represent restricted and un-restricted account privileges. For example, the restricted and un-restricted account privileges may be identified from the list of account privileges 166. The un-restricted account privileges are available for use in a network session while in the cool-down status, while the restricted account privileges are not available to use while in the cool-down status. In some examples, a user account may only have restricted account privileges, in which case, during the cool-down time period, the user account is entirely frozen and no user actions are permitted. In other examples, the user account may have some restricted account privileges and other unrestricted account privileges. When unrestricted account privileges exist, during the cool-down time period, the actions associated with the unrestricted account privileges are authorized, while the actions associated with the restricted account privileges are denied.

Optionally, unrestricted account privileges may be defined at run-time and various actions/privileges may be dynamically classified. For example, at run-time, an account privilege may be defined as restricted/denied following a risk evaluation of the corresponding requested action. For example, the account management module 142 may allow/permit a low cost (e.g., $10) order from a device, but deny a high cost order (e.g., $1000) from the same device.

At 315, the account management module 142 conveys a reset notification to one or more trusted access points associated with the user account. The reset notification indicates that the credential has been changed in connection with the user account. By way of example, one or more trusted access points 165 (FIG. 1B) may be identified from the user account 160 in the data store 136. Optionally, reset notifications may be sent to social media accounts of the account owner, as well as trusted access points and social media accounts of other individuals associated with the valid account owner. For example, when the account management module 142 determines that all access points (trusted or otherwise) have been compromised that are known to be utilized by the account owner, it may be desirable to convey a reset notification or other notification that an account has been compromised to a trusted third-party (e.g. a family member, work colleague, manager and the like). A client computing device, browser, application or other access point utilized by the trusted third party may be identified through various manners, such as through social media connections to the owner of the user account.

At 316, the account management module 142 determines whether a reset deny instruction has been received from a trusted access point 111. When a reset deny instruction is not received at 316, flow moves to 318. When a reset deny instruction is received, flow moves to 317, where the account management module 142 locks or freezes the user account and denies all further access until a valid or true owner takes appropriate actions. For example, the owner may need to contact a network service administrator, verify the owner's authenticity and authorized the administrator to unlock the user account. Optionally, when a reset deny instruction is received, a password change (that may have previously been entered at 312 in FIG. 3A) may be canceled or rolled back, and the old password reinstated. As noted herein, certain requests to change credentials may occur from within a user account, in which case a password may already have been compromised. When a request to change credentials occurs from within a user account or in another circumstance that indicates that a password may have been compromised, the a message may be conveyed to a trusted access point requesting the valid owner of the user account to step through a process to sanitize the account. For example, when it is believed that a malicious third-party has obtained a password and access to an email account, the operation at 317 may blacklist the password and email account until a user confirms that the email account has been secured (e.g. changing the email address, user ID and/or email account password). Optionally, the reset notification (or a separate notification) may direct the valid owner of the user account to change their email account password or to take other sanitizing actions.

Optionally, the network service 130 may track the number of times that user accounts are compromised. When a user account is compromised a predetermined number of times, the account may be locked and the valid owner given instructions for corrective actions (e.g. through a trusted access point). The user account would remain locked until the user has taken the appropriate corrective actions. Optionally, the operations at 316 and 317 may be omitted entirely.

At 318, the account management module 142 determines whether a reset verification has been received from a trusted access point. For example, with reference to FIG. 2G, the account management module 142 determines whether the confirm link 272 was selected after the reset notification message 270 was presented on a trusted access point. Optionally, a valid owner of the user account may enter a reset verification by logging into the account and entering predetermined information. Optionally, a valid owner of the user account may enter a reset verification through a different client computing device other than the trusted access point to which the reset notification was sent. Optionally, as explained herein, the reset verification may be generated by a trusted access point that represents a networked dedicate device (e.g. a single purpose purchase device, a networked environment control device and the like). When a networked dedicated device is used to generate the reset verification, after sending the reset notification, the network service 130 monitors the corresponding trusted access point 111 for a corresponding output. The account management module 142 determines whether a reset verification has been received based upon whether the networked dedicated device generates the corresponding output. For example, the account management module 142 may monitor the single purpose purchase device to be pressed X times. As another example, the account management module 142 may monitor a networked thermostat to be adjusted between a predetermined series of temperature settings.

At 318, the account management module 142 also determines whether the cool-down time period has timed out. When either of the conditions are true, namely a reset verification has been received from a trusted access point or the cool-down time period times out, flow moves to 322. Optionally, when the cool-down time period expires, a notification may be sent to a trusted access point to inform the user that the user account is changing status back to the open access status and will provide availability/access to all restricted and unrestricted account privileges.

Otherwise, flow moves to 324, where the account management module 142 continues to grant restricted access by permitting only the subset of restricted privileges to be carried out.

For example, the account management module 142 grants access, during the cool-down time period, to un-restricted account privileges that include at least one of viewing pre-existing digital content stored in connection with the user account, performing one-click transactions. Following the operation at 324, flow returns to 316. The process repeats the operations at 316, 318 and 324, during which the account management module 142 continues to grant restricted access and manages availability of at least a restricted subset of the account privileges based on at least one of the cool-down time period or a reset verification from the one or more client computing devices.

At 322, the account management module 142 manages the network session by permitting the restricted and unrestricted privileges to be carried out. For example, the account management module 142 grants the client computing device 110 account privileges that include at least one of i) accessing cloud drive content, ii) viewing transaction history, iii) viewing device session history, iv) changing an address associated with the user account; or v) changing a financial instrument associated with the user account.

The operations of FIG. 3A are described generally in connection with sending a reset notification to, and receiving a reset verification from, a trusted access point that represents a computer, tablet device, smart phone or other network enabled multi-featured electronic device. Alternatively or in addition, the reset verification may be received from networked dedicated electronic devices, such as a single purpose purchase device and/or a networked environment control device (generally referred to as networked dedicated devices). For example, the reset verification may correspond to a predefined sequence of actions or inputs to be taken in connection with the single purpose purchase device, environment control device or other networked dedicated device. Optionally, the reset notification may be sent to networked dedicated devices that have some form of display and/or output to convey the reset notification to a trusted user.

Figure 3B:
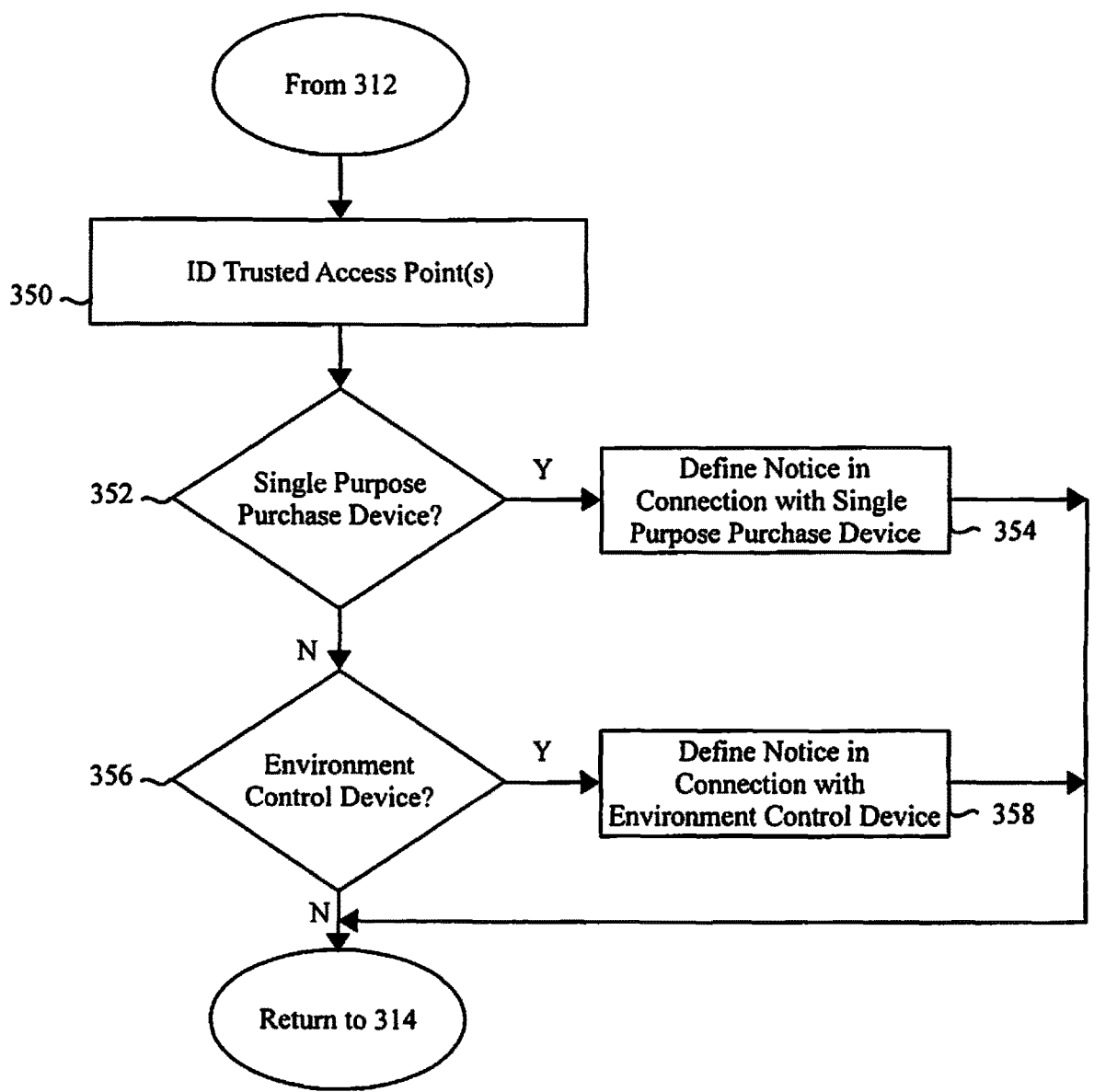
FIG. 3B illustrates operations that may be performed in connection with constructing reset notifications, for which the reset verification is generated utilizing a networked dedicated electronic device in connection with embodiments herein.

FIG. 3B illustrates operations that may be performed in connection with constructing reset notifications, when utilizing a networked dedicated electronic device. The operations of FIG. 3B may be performed between the operations of 312 and 314 in FIG. 3A. In FIG. 3B, at 350, the account management module 142 identifies the nature of the trusted access point to be used when generating a reset verification. At 352, the account management module 142 determines whether the trusted access point represents a single purpose purchase device. If so, flow moves to 354. At 354, the account management module 142 defined a reset notification that includes instructions regarding how to operate a single purpose purchase device to generate a reset verification. For example, the notice defined at 354 may instruct the user to press the single purpose purchase device a predetermined number of times successively. After 354, flow moves to the end and returns to 314 in FIG. 3A.

Returning to 352, when the trusted access point does not represent a single purpose purchase device, flow advances to 356. At 356, the account management module determines whether the trusted access point represents a networked environment control device. If so, flow moves to 358. Otherwise, the process returns to 314 in FIG. 3A. At 358, the account management module 142 defines a reset notification that includes instructions regarding how to operate a networked environment control device to generate the reset verification. For example, the notice defined at 358 may instruct the user to adjust a thermostat control device to a series of specific temperatures and then return the thermostat control device to the prior setting. As another example, the notice may instruct the user to change one or more specific lighting switches between a predetermined series of on and off states and then return the lighting switch to the prior setting. Thereafter, flow returns to 314 in FIG. 3A. When a networked dedicated device is to be used to generate the reset verification, after sending the reset notification, the network service 130 monitors the corresponding trusted access point 111 for a corresponding output. The account management module 142 determines whether a reset verification has been received based upon whether the networked dedicated device generates the corresponding output (e.g. was a single purpose purchase device pressed X times, was the thermostat adjusted between the corresponding temperature settings).

Optionally, the operations of FIG. 3B may be repeated in connection with various types of potential trusted access points. When the relevant type of trusted access point is identified, the corresponding notice is defined and flow returns to 314 in FIG. 3A.

Figure 4:
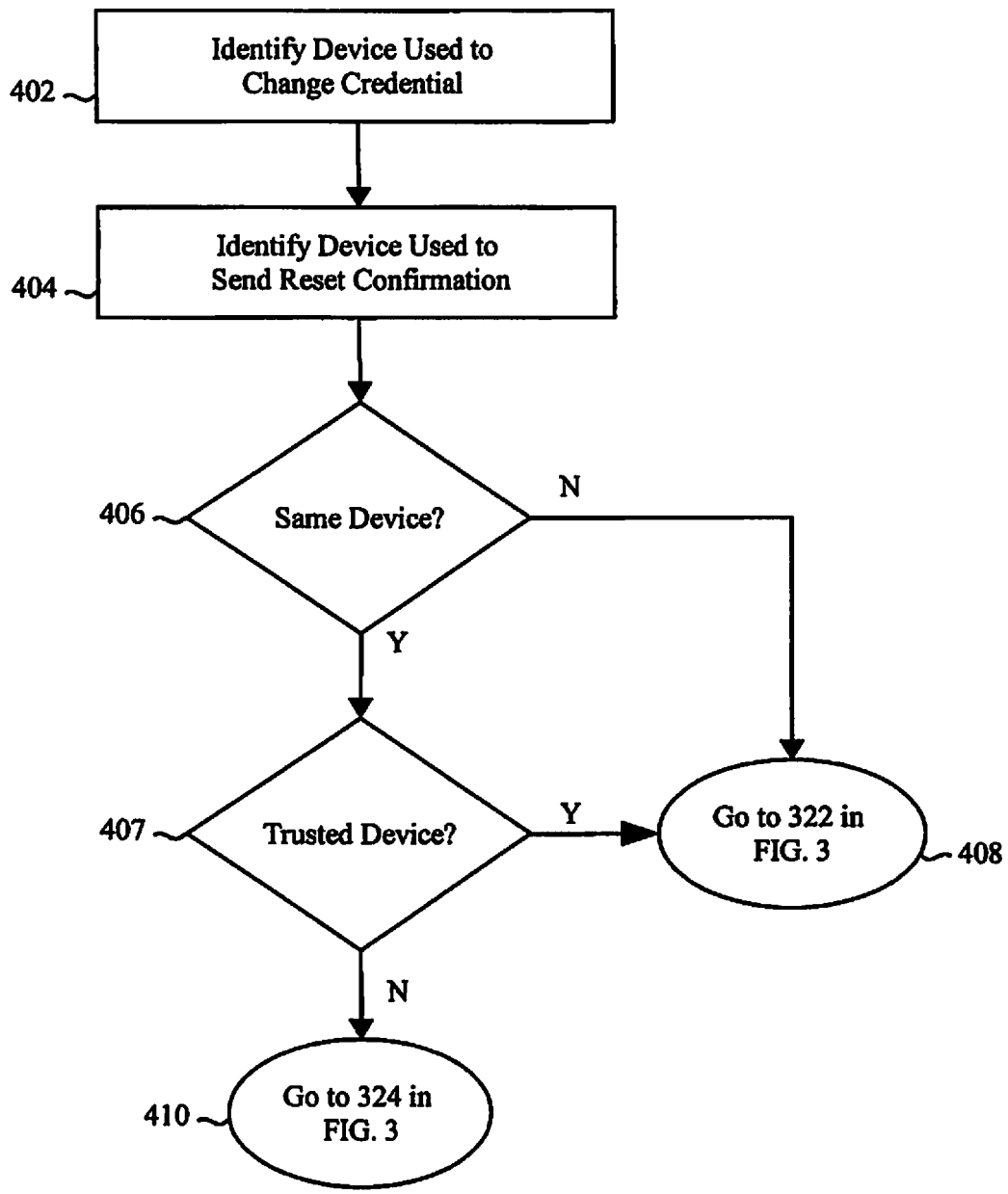
FIG. 4 illustrates a process for determining whether a valid reset verification has been received in accordance with embodiments herein.

FIG. 4 illustrates a process for determining whether a valid reset verification has been received in accordance with embodiments herein. The process of FIG. 4 is carried out during the determination at 318 in FIG. 3A when a candidate reset verification is received and the cool-down time period has not yet expired. At 402, the account management module 142 identifies the access point (e.g. client computing device) that was used to change the credential (e.g. reset the password) at 312 in FIG. 3. At 404, the account management module 142 identifies the access point that was used to generate the reset verification. By way of example, the access point(s) identified at 402 and 404 may be identified based upon IP address, user agent, Mac address, other header information conveyed in connection with network requests and/or additional information conveyed between the client computing device and the network service 130.

At 406, the access management module 142 determines whether the same or different access point(s) are used to change the credentials and to send the reset verification. When different devices are used, this is considered an indication that the true owner of the user account desired to change the user credentials. Accordingly, when different devices are used to change the credential and send the reset verification, flow branches to 408 and the process returns to the operation at 322, at which the network session is supported while granting the user access to all available privileges (e.g. including restricted and unrestricted privileges). Alternatively, at 406, when the same access point is used to change the credential and generate the reset verification, flow advances to 407.

At 407, the account management module 142 determines whether the client computing device 110, associated with the access point, used to generate the reset verification represents a trusted client computing device. For example, the account management module 142 may compare an identification of the client computing device, that originated the incoming reset verification, with the stored list of trusted access points. As noted above in connection with FIG. 1B, a list may be maintained of trusted access points 165 that have been used in the past in connection with the user account. Alternatively, the client computing device, that originated the incoming reset verification, may be declared to represent a trusted access points through alternative manners. For example, a client computing device may be classified as "trusted" based on session history, session behavior and other criteria. For example, when the client computing device is determined to represent a stationary device that never moves from a home or office location (e.g., a desktop computer), the client computing device may be treated as a trusted device.

At 407, when the reset verification is generated by a trusted access point, flow moves to 408 (corresponding to the operation at 322 in FIG. 3). Alternatively, flow moves to 410, which corresponds to the operations at 324 in FIG. 3.

Optionally, the operations at 406 and 407 may be reordered such that the determination at 407 is performed earlier to determine whether the reset verification is generated by a trusted access points. When the reset verification is generated by a trusted access points, in this alternative implementation, it does not matter whether the credentials were changed by the same client computing device that generates the reset verification. Accordingly, flow branches to 408 and the network session is managed to provide full access to all available privileges. Otherwise, the process will determine whether the same client computing device 110 changed the credentials and generated the reset verification. If different client computing devices 110 were used, flow returns 322 in FIG. 3, otherwise flow returns to 324.

Figure 5:
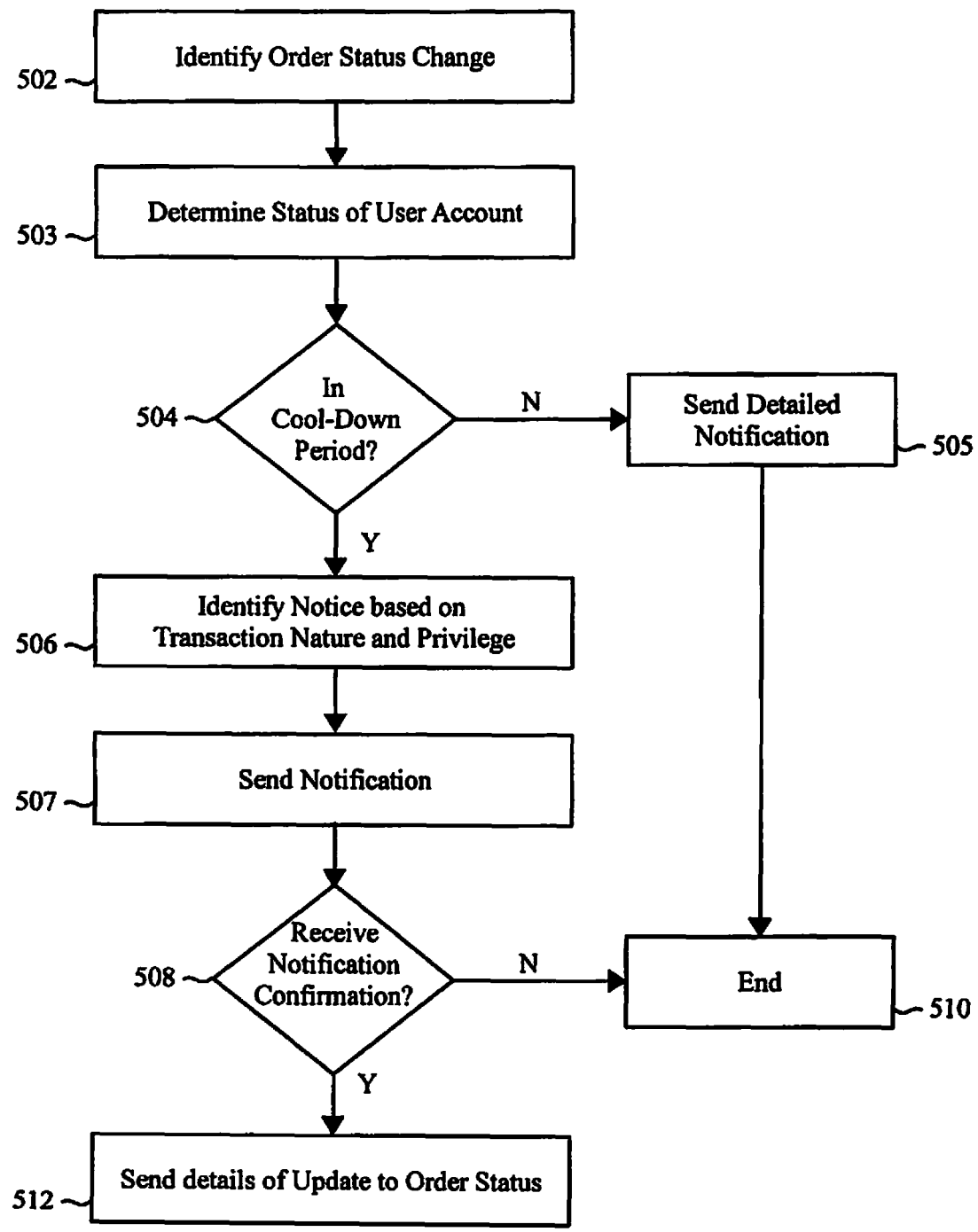
FIG. 5 illustrates a process for providing order status changes during a cool-down time period in accordance with embodiments herein.

FIG. 5 illustrates a process for providing order status changes during a cool-down time period in accordance with embodiments herein. At 502, a transaction management module 144 identifies that an order status has changed in connection with a transaction that is in the process of being completed. For example, the transaction may concern ordering an item through an e-commerce merchant. An order status may change multiple times between the time a customer completes the payment process and the item is ultimately delivered. For example, order status changes may occur when an item is shipped, when an expected delivery date is determined or changed, when an item is placed on back order, when an item on back-order has become available for shipment and the like.

At 503, the transaction management module 144 determines the "state" of the user account, namely whether the user account is in a cool-down state, an open or full access state or otherwise. At 504, when an account is not in a cool-down state, the flow branches to 505. At 505, the order status change is processed in a conventional manner in connection with a user account that is in an open or full access state. For example, a detailed notification is sent to one or more designated access points. The detailed notification includes various information regarding the change in the status of the order, and the process of FIG. 5 ends.

Alternatively, at 504, when the user account is determined to be in a cool-down state, flow moves to 506. At 506, the transaction management module 144 identifies the type of notice to be provided based on the nature of the transaction and based on the account privileges that are available when the user account is in the cool-down state. For example, the transaction may concern an electronic item (e.g. book, song, etc.) that has been pre-ordered before the item becomes available to the public. When the item becomes available, the transaction management module 144 may designate a notice that indicates that the electronic item is now available for download. Alternatively, the item may represent a physical product to be shipped, in which case the transaction management module 144 may designate a notice indicating that the product has shipped.

At 506, the type of notice is also based on the account privileges that are available during the cool-down time period. For example, details regarding a change in order status may be classified as "high risk." Consequently, when an order status change occurs during the cool-down time period, the transaction management module 144 may determine, at 506, to provide very limited information in the notice regarding the change in order status. For example, during the cool-down time period, the notice may simply represent a generic email or text message indicating that a status change has occurred in connection with a transaction. The notice may further indicate that the user will need to login to the user account to obtain more details regarding the status change. Alternatively, the notice may provide an intermediate level of information, such as an indication that a product has been shipped (without identifying the product or shipping address). Alternatively or in addition, the notice of intermediate detail may indicate that an item is available for download (without identifying the nature of the item).

At 507, the notification is sent to one or more access points designated in the user account. For example, the access point may represent one or more of a designated email address, a text message service associated with a phone number, an Mshop application, a browser session and the like. The access point may be varied based on whether the user account is in a cool-down time period. For example, during a cool-down time period, the notice may be sent only to a known trusted access point. A trusted access point may be determined in various manners. For example, an Mshop application may be designated as a trusted access point (e.g., when the Mshop application maintains separate credentials or at least a separate password). Alternatively, the notice may be sent to an email address, phone number, M shop application and the like, without regard for whether the cool-down time period remains in effect.

At 508, the transaction management module 144 determines whether a notification confirmation is received from a trusted access points. The notification confirmation represents a response by a valid user of an account that the user has received the notice sent at 507. In some embodiments, all notification confirmations may be treated to be from valid users. Alternatively, a source of a notification confirmation may be considered to determine whether the notification confirmation is to be "trusted." For example, select access points may be deemed to be trusted and the notification confirmation is only treated as valid when received from one of the trusted access points. When no notification confirmation is received or the notification confirmation receipt is received from an un-trusted or unknown client computing device, flow advances to 510 and the process ends. When a notification confirmation is received and the confirmation is generated by a trusted access points, flow moves to 512. At 512, the transaction management module 144 sends details regarding the update in the order status to the trusted access point.

It is recognized that the foregoing workflow represents one example of the process for verifying credential reset. Optionally, the individual operations of the FIGS. may be reordered, omitted or otherwise supplemented, while remaining within the scope of embodiments contemplated herein. The operations described in connection with the FIGS. are carried out by one or more processors executing program instructions save in memory. In at least some embodiments, a computer system that implements a portion or all of one or more of the technologies described herein, such as the session management module, account management module and confidence module, may include a general-purpose computer system that includes or is configured to access one or more computer-readable media and execute program instructions to perform the processes and operations described herein.

Figure 6:
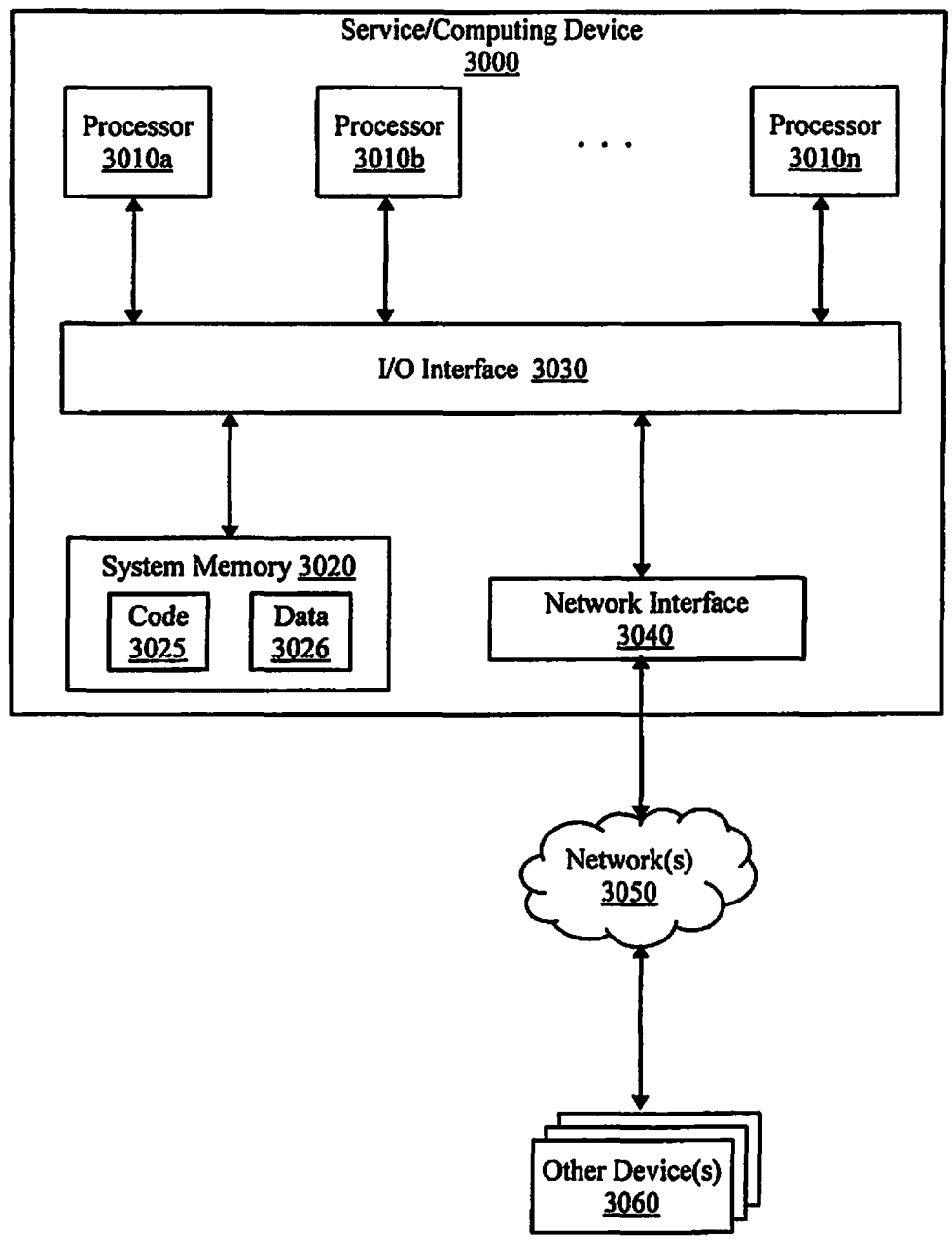
FIG. 6 illustrates a general-purpose computing device utilized to implement embodiments herein.

FIG. 6 illustrates a general-purpose computing device 3000 that implements some or all of the operations described herein. In the illustrated embodiment, computing device 3000 includes one or more processors 3010 coupled to a system memory 3020 via an input/output (I/O) interface 3030. Computing device 3000 further includes a network interface 3040 coupled I/O interface 3030. In various embodiments, computing device 3000 may be a uniprocessor system including one processor 3010 or a multiprocessor system including several processors 3010 (e.g., 2, 4, 8 or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, the processors 3010 may commonly, but not necessarily, implement the same ISA.

System memory 3020 may be configured to store code 3025 that includes program instructions that carry out all or a portion of the processes and operations described herein. The system memory 3020 also includes data 3026 (e.g., the data stored in the data store of FIGS. 1A and 1B) accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in the Figures, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Examples are provided in connection with protecting individuals and/or entities who have user accounts that are used to buy items or utilize service in connection with a network service. Additionally or alternatively, the embodiments herein may be implemented in connection with individuals and/or entities who have user accounts that are used to sell items through a network service. For example, the cool-down time periods, notifications and reset verifications described herein may be used to prevent malicious users from posting false items for sale on an e-commerce website, or from posting false account information (e.g., when a third party is attempting to buy an item from the malicious user).

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Various embodiments may further include receiving, sending, or storing instructions and/or data implemented in accordance with the foregoing description upon a computer-readable medium. Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon executable instructions that, as a result of execution by one or more processors of a computer system, cause the computer system to at least:
   provision a service for a user associated with a user account with account privileges to post items for sale;
   receive a request from a second user to use the service;
   detect that the second user is suspected to use the service to perform fraudulent activity, wherein the fraudulent activity includes posting a false item for sale;
   limit access to the account privileges based at least in part on the detection;
   cause a notification associated with the request to be presented by a network application that is different from an application from which the request was issued, wherein the notification indicates that the account privileges associated with the user account is limited;
   receive information to verify authenticity of the user in response to the notification;
   cause a second notification to be presented by the network application, wherein the second notification indicates that the authenticity of the user has been verified; and
   restore access to the account privileges as a result of verifying the authenticity of the user.

2. The non-transitory computer-readable storage medium of claim 1, wherein the network application is an e-mail service and the notification is an e-mail message.

3. The non-transitory computer-readable storage medium of claim 1, wherein the fraudulent activity further includes posting false account information.

4. The non-transitory computer-readable storage medium of claim 1, wherein limiting access to the account privileges includes denying access to financial transactions associated with the account privileges.

5. The non-transitory computer-readable storage medium of claim 1, wherein restoring access to the account privileges as a result of verifying the authenticity of the user includes enabling an administrator to unlock the user account.

6. The non-transitory computer-readable storage medium of claim 1, the notification further indicates a series of tasks for the user to complete to verify authenticity of the user prior to removing the limitation on the account privileges.

7. A computer-implemented method, comprising:
   under the control of one or more computer systems configured with executable instructions,
      detecting activities that are being performed on a service without permission from a user, wherein the user is associated with a user account with account privileges;
      restricting access to the account privileges based at least in part on the detection;
      causing a notification to be presented by a network application that is different from the service from which activities were performed, wherein the notification indicates that the account privileges associated with the user account is restricted;
      receiving information to verify authenticity of the user in response to the notification;
      causing a second notification to be presented by the network application, wherein the second notification indicates that the authenticity of the user has been verified; and
      restoring access to the account privileges as a result of verifying the authenticity of the user.

8. The method of claim 7, wherein the detected activities further include using the service to post false items for sale or false account information of the user.

9. The method of claim 7, wherein the detected activities are performed by a third-party user impersonating the user.

10. The method of claim 7, wherein the network application is an e-mail service that is associated with an email account accessible by the user.

11. The method of claim 7, wherein information received includes documents indicating authenticity of the user.

12. The method of claim 7, wherein restoring access to the account privileges as a result of verifying the authenticity of the user includes enabling an administrator to unlock the user account.

13. The method of claim 7, wherein restricting access to the account privileges includes denying a portion of the account privileges for use by the user.

14. A system, comprising:
   at least one processor; and
   a memory coupled to the at least one processor, wherein the memory stores program instructions, wherein the program instructions are executable by the at least one processor to:
      detect suspicious activity being performed, using a first network application, that is associated with a user account having account privileges;
      limit access to account privileges associated with the user account;
      send a notification to a second network application associated with the user account to indicate that access to account privileges associated with the user account are limited, wherein the second network application is a different application than the first network application; and
      limit access to the account privileges until receipt of information that verifies authenticity of the user account in response to the notification.

15. The system of claim 14, wherein the program instructions are further executable to:
   review the information that verifies authenticity of the user account; and
   send a second notification to the second network application to request additional information to verify authenticity of the user account.

16. The system of claim 14, wherein the program instructions are further executable to remove limitations associated with accessing the account privileges after receipt of information that verifies authenticity of the user account.

17. The system of claim 14, wherein the first network application is an e-commerce website and the second network application is an e-mail service.

18. The system of claim 17, wherein the second network application is a trusted access point previously indicated by the user account to be secure.

19. The system of claim 14, wherein suspicious activity comprises using the first network application to post false items for sale or false account information associated with the user account.

20. The system of claim 14, wherein limiting access to account privileges associated with the user account includes denying requests associated with financial transactions from the user account.

* * * * *